Sept. 3, 1935. T. MIDGLEY, JR., ET AL 2,013,062
PREPARATION OF ALIPHATIC HALO-FLUORO COMPOUNDS
Original Filed Feb. 26, 1931
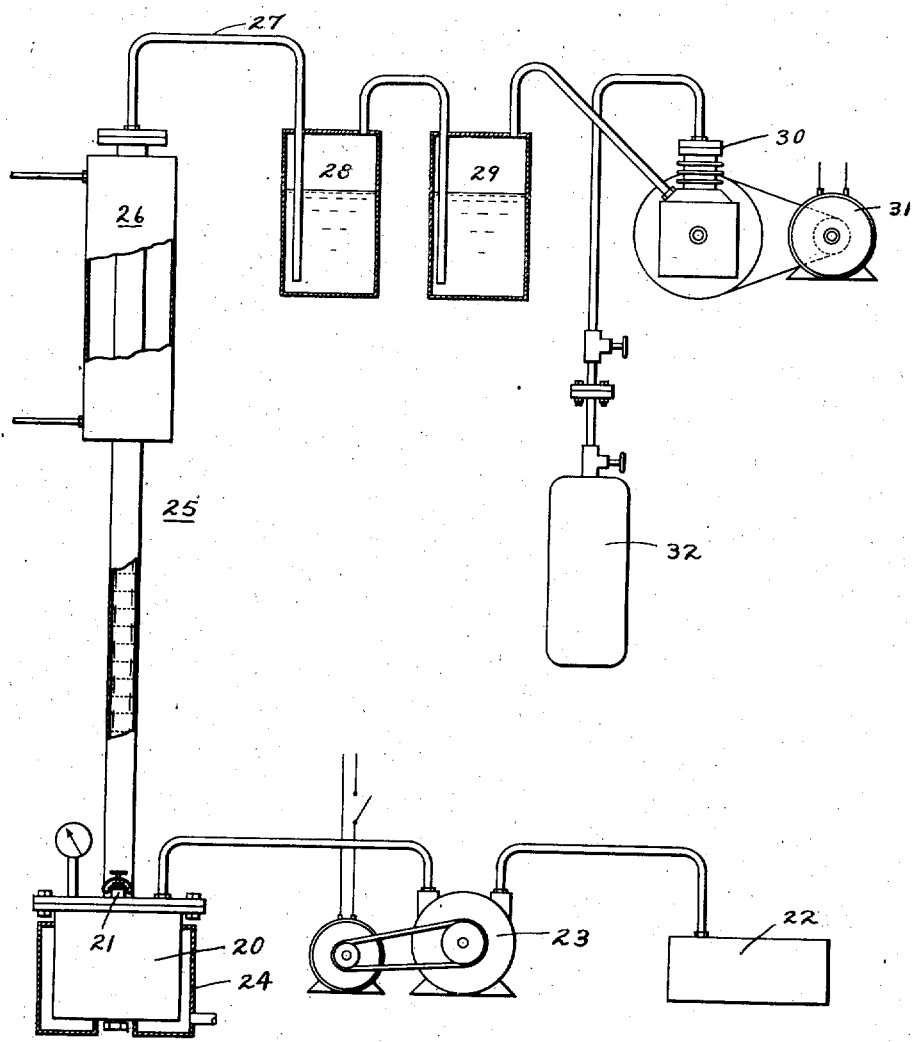
INVENTORS
Thomas Midgley, Jr.
BY Albert L. Henne
Spencer, Hardman & Fehr
ATTORNEYS Patented Sept. 3, 1935

2,013,062

UNITED STATES PATENT OFFICE 2,013,062

PREPARATION OF ALIPHATIC HALO-FLUORO COMPOUNDS

Thomas Midgley, Jr., Worthington, and Albert L. Henne, Columbus, Ohio, assignors to Frigidaire Corporation, Dayton, Ohio, a corporation of Delaware Application February 26, 1931, Serial No. 518,489
Renewed June 27, 1934

5 Claims. (Cl. 260—162)

This invention relates to a method of manufacturing fluoro and/or halo-fluoro aliphatic hydrocarbon derivatives.

The principal objects of the invention are to provide efficient and economical methods of manufacture of fluoro and/or halo-fluoro aliphatic hydrocarbon derivatives.

This invention comprises the interaction of a metal fluoride, a halogen derivative of an aliphatic hydrocarbon, and an antimony salt. Where the antimony salt is also a catalyst as where a pentavalent antimony salt is used, the reaction proceeds. Where the antimony salt is not also a catalyst, I supply another substance as a catalyst.

A specific example of the reactants and the reactions of the first type is represented by the equation:

A specific example of the reactants and reactions of the second type is represent by the equation:

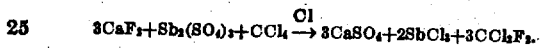

In the first type of reaction the antimony compound is pentavalent and apparently serves the dual function of an antimony salt which enters into the reaction and as a catalyst for the reaction. In the second type the antimony salt enters into the reaction and the chlorine is employed as the catalyst. However, the two reactions are essentially the same.

The $CaF_2$ and the $KF$ are examples of metal fluorides. The carbon tetrachloride is a common example of a halogen derivative of an aliphatic hydrocarbon. Such derivatives include compounds belonging to the ethane, propane, ethylene, etc. series, among which may be named $C_2Cl_6$, $C_3H_2Cl_6$, $C_2Cl_4$, $CHCl_3$ and $CHBr_3$. By fluorating such compounds there are obtained halo and/or halo-fluoro derivatives of the aliphatic hydrocarbons such as $C_2F_4Cl_2$, $C_3H_2Cl_3F_3$, $C_2Cl_3F$, $CHCl_2F$, and $CHBr_2F$.

The antimony salt named in the second example is a sulfate but other salts such as antimony trichloride may be used. Also, in the second example, where chlorine is named as the catalyst, other catalysts such as antimony pentachloride may be employed.

The limiting of the reactions to obtain a high yield of any particular product desired and the minimizing of side reactions are promoted by employing compounds relatively free from impurities and more particularly relatively free from water.

To further illustrate an example of the second type, conditions of operation which promote the yield are given.

Various forms of apparatus may be employed to carry out the present invention. One form of apparatus is illustrated because it can be operated efficiently for limiting the products to any one fluoride desired. The figure of the drawing is a diagrammatic illustration of this apparatus.

Calcium fluoride and antimony sulfate, together with a small quantity of catalyst (antimony pentachloride), are introduced through the opening 21 into the autoclave 20, where the fluoration zone is maintained. The opening 21 is closed. The carbon tetrachloride, stored in the tank 22, is introduced into the autoclave 20 by any suitable means such as the pump 23. The reaction then proceeds, and, if desired, its rate may be controlled by a temperature control jacket 24. In this particular instance, the autoclave is kept at about 176° F.

The pressure within the autoclave 20 is allowed to build up to about 55 pounds to obtain the desired fractionation conditions in the column 25. The dephlegmator 26 is maintained at about 75° F. to 80° F. This permits the passage of dichlorodifluoromethane and refluxes the insufficiently fluorated products monofluorotrichloromethane and unacted upon carbon tetrachloride. In this particular case the dichlorodifluoromethane is discharged through the pipe 27, and is washed by passing it through a sodium hydroxide solution in the washers 28 and 29. This derivative ($CCl_2F_2$) is taken from the washers and used or stored in any suitable manner. It may be compressed by the compressor 30 driven by the motor 31 which discharges the compressed derivative into the receiver 32.

A high yield of the desired fluoro-halo derivative is obtained by returning to the fluoration zone any insufficiently fluorated hydrocarbon derivatives for further fluoration, and by removing or releasing from such zone the adequately fluorated derivative.

What is claimed is as follows:

1. The process comprising interacting a metal fluoride other than antimony, an aliphatic hydrocarbon halogen derivative containing halogen other than fluorine, and an antimony salt other than a fluoride to form an aliphatic fluoro-halo derivative.

2. The process comprising interacting a metal fluoride other than antimony, an aliphatic hydrocarbon halogen derivative containing halogen other than fluorine, and a pentavalent antimony salt other than a fluoride to form an aliphatic fluoro-halo derivative.

3. The process which comprises interacting a metal fluoride other than antimony, a methane halogen derivative containing halogen other than fluorine, and an antimony salt other than a fluoride to form a halo-fluoro derivative of methane.

4. The process which comprises interacting a metal fluoride other than antimony, a methane halogen derivative containing halogen other than fluorine, and a pentavalent antimony salt other than a fluoride to form a halo-fluoro methane derivative.

5. The process which comprises interacting calcium fluoride, carbon tetrachloride and antimony sulphate.

THOMAS MIDGLEY, Jr.
ALBERT L. HENNE.

CERTIFICATE OF CORRECTION.

Patent No. 2,013,062. September 3, 1935.

THOMAS MIDGLEY, JR., ET AL.

It is hereby certified that the above numbered patent was erroneously issued to "Frigidaire Corporation, of Dayton, Ohio, a corporation of Delaware, whereas said patent should have been issued to General Motors Corporation, a corporation of Delaware, as assignee by mesne assignments of the entire interest in said invention, as shown by the records of assignments in this office; and that the said Letters Patent should be read with this correction therein that the same may conform to the record of the case in the Patent Office.

Signed and sealed this 19th day of November, A. D. 1935.

Leslie Frazer.
(Seal) Acting Commissioner of Patents.

fluoride other than antimony, an aliphatic hydrocarbon halogen derivative containing halogen other than fluorine, and a pentavalent antimony salt other than a fluoride to form an aliphatic fluoro-halo derivative.

3. The process which comprises interacting a metal fluoride other than antimony, a methane halogen derivative containing halogen other than fluorine, and an antimony salt other than a fluoride to form a halo-fluoro derivative of methane.

4. The process which comprises interacting a metal fluoride other than antimony, a methane halogen derivative containing halogen other than fluorine, and a pentavalent antimony salt other than a fluoride to form a halo-fluoro methane derivative.

5. The process which comprises interacting calcium fluoride, carbon tetrachloride and antimony sulphate.

THOMAS MIDGLEY, Jr.
ALBERT L. HENNE.

CERTIFICATE OF CORRECTION.

Patent No. 2,013,062.  September 3, 1935.

THOMAS MIDGLEY, JR., ET AL.

It is hereby certified that the above numbered patent was erroneously issued to "Frigidaire Corporation, of Dayton, Ohio, a corporation of Delaware, whereas said patent should have been issued to General Motors Corporation, a corporation of Delaware, as assignee by mesne assignments of the entire interest in said invention, as shown by the records of assignments in this office; and that the said Letters Patent should be read with this correction therein that the same may conform to the record of the case in the Patent Office.

Signed and sealed this 19th day of November, A. D. 1935.

Leslie Frazer
Acting Commissioner of Patents.

(Seal)